(12) United States Patent  
Gravina (10) Patent No.: US 9,307,014 B1  
(45) Date of Patent: Apr. 5, 2016

(54) SUPPLEMENTAL CAPACITY UNIT FOR PORTABLE WIRELESS DEVICES

(71) Applicant: Matteo B. Gravina, Laredo, TX (US)

(72) Inventor: Matteo B. Gravina, Laredo, TX (US)

( * ) Notice: Subject to any disclaimer, the term of this patent is extended or adjusted under 35 U.S.C. 154(b) by 212 days.

(21) Appl. No.: 13/957,927

(22) Filed: Aug. 2, 2013

(51) Int. Cl.
- *H04N 7/14* (2006.01)
- *H04L 29/08* (2006.01)
- *H04W 92/10* (2009.01)

(52) U.S. Cl.
CPC .............. *H04L 67/10* (2013.01); *H04W 92/10* (2013.01)

(58) Field of Classification Search
CPC ... H04N 21/482; H04N 21/485; G08C 17/02; B08B 9/00; G06F 13/385
See application file for complete search history.

(56) References Cited

U.S. PATENT DOCUMENTS

2011/0167175 A1*  7/2011  Chang .................. G06F 13/385  
709/250

\* cited by examiner

*Primary Examiner* — Kim T Nguyen  
(74) *Attorney, Agent, or Firm* — Donald J. Ersler (57) ABSTRACT

A supplemental capacity unit for portable wireless devices preferably includes a housing, an electronic control board, a hard drive, a communication software program, a wireless modem, an antenna, random access memory and a plurality of ports. The electrical control board is retained in the housing. The electronic control board is preferably microprocessor based. The communication software program is preferably stored on the hard drive. The communication software program is downloaded to the portable wireless device. The communication software program allows the tablet to access the computing power, memory and storage capacity of the wireless device control unit. The wireless modem provides a connection to the internet. The antenna is connected to the wireless modem. The antenna receives and transmits wireless signals. A power supply provides an electrical power to all the electrical components.

12 Claims, 9 Drawing Sheets

SUPPLEMENTAL CAPACITY UNIT FOR PORTABLE WIRELESS DEVICES

BACKGROUND OF THE INVENTION

1. Field of the Invention

The present invention relates generally to wireless devices and more specifically to a supplemental capacity unit for portable wireless devices, which provides increased computing capability for the portable wireless devices.

2. Discussion of the Prior Art

The advent of the computer has brought about an array of conveniences to everyday life. Computers in the beginning were crude and their tasks limited to basic operations. The basic personal computer started with subcomponents. The computer peripherals such as processor, memory, and storage, apart from input and out connectivity were enough for the tasks of the day. Internet requirements were not too demanding and thereby sufficient for the computer capacities of the day.

Advances in personal computer grew in speed with advanced processors, memory, storage and other capacities. Later, portability came into the picture with the laptop. Now users could use their computers at work, home, or in a mobile environment. With mobility came wireless connectivity, soon after Internet wireless connection came into being. Just as personal computers provided more capacity, laptops started to increase in speeds and capacities. Still the practical portability factor came into play with the laptop. The advent of portable wireless devices, such as tablets and cellular phones started to replace the laptop. Wireless connections have allowed wireless portable devices to replace personal computers and laptops.

Today the tablet is gaining ground on personal computers and laptops. The tablet's ease of use and wireless access to the Internet have made the tablet more popular. Wireless modems and routers allow anyone to connect their tablet to the Internet with a wide spread of hotspots. Unfortunately, tablets still lack most if not all of the capacities of personal computers and laptops.

Unlike personal computers and laptops, tablet processing lacks the capacities of their predecessors. Tablet processors are often risc processors and not cisc processors. The risc processors have limited capabilities in comparison to cisc processors, but do require less power, thereby extending battery life.

In addition to processing, memory sizes in tablets are also small in comparison to personal computers and laptops. Memory comes second in nature to computer architecture. The amount of memory that a tablet requires is for the most part the needs of small applications created by software programmers. Better known as apps, these software applications are limited in capabilities such as a full package software suite, or software program. Therefore, the memory of a tablet is a fraction of personal computers, laptops, and notebooks.

In addition to processing and memory, storage also comes into play. Because a tablet's processing and memory is limited in comparison, full fledged computer programs, and software suites are non-existent for tablets. Therefore, storing a full software program or suite is not possible for a tablet.

Further, tablet I/O ports, whether physical or wireless have limited connectivity. Tablets lack various standards in connectivity to other devices. The interface lacking on tablets include IEEE 1394 Standard, Peripheral Component Interconnect Express (PCIe), High-Definition Multimedia Interface (HDMI), Digital Visual Interface (DVI), Redundant Array of Independent Disks (RAID) and IEEE 802.8 Standard in addition to multi peripheral power supply. Wireless interface is more common to tablets as their small size limit the use physical interface ports.

Software limits are apparent as operating systems, office suites and software programs are not capable of being run on tablets. The operating systems of tablets have limited real time, multi-user, multi-tasking, distributed or embedded capabilities. Therefore, for the most part, tablets run small apps, which are shorten versions of regular applications. App's as opposed to applications are variants of subroutines that allow the user several operations, but limit the user to just a few.

Accordingly, there is a clearly felt need in the art for a supplemental capacity unit for portable wireless devices, which increases computing capability, and increases memory and storage capacity of a portable wireless device for running applications and programs that cannot be normally run on a portable wireless device.

SUMMARY OF THE INVENTION

The present invention provides a supplemental capacity unit for portable wireless devices, which provides increased computing capability for a portable wireless device. The supplemental capacity unit for portable wireless devices (wireless device control unit) preferably includes a housing, an electronic control board, a hard drive, a communication software program, a wireless modem, an antenna, random access memory and a plurality of ports. The housing may be any suitable shape or design. The electrical control board is retained in the housing. The electronic control board is preferably microprocessor based. The hard drive provides storage for the electronic control board. The communication software program is preferably stored on the hard drive. The communication software program is downloaded to the portable wireless device. The communication software program allows the tablet to access the computing power, memory and storage of the wireless device control unit. The wireless modem provides a connection to the Internet. The antenna is connected to the wireless modem. The antenna receives and transmits wireless signals. At least one USB port, at least one display port and a ethernet port are preferably connected to the electronic control board. A power supply provides an electrical power to all the electrical components.

Accordingly, it is an object of the present invention to provide a wireless device control unit, which supplements processing power by working in conjunction with a portable wireless device processor with the result of extended processing speeds, capacities, and instruction sets.

It is a further object of the present invention to provide a wireless device control unit, which supplements processing power of a portable wireless device by adding at least one processor.

It is another object of the present invention to provide a wireless device control unit, which allows a portable wireless device to use random access memory of the wireless device control unit.

It is yet a further object of the present invention to provide a wireless device control unit, which allows a portable wireless device to uses random access memory of the wireless connection of other multiple portable wireless devices.

It is yet a further object of the present invention to provide a wireless device control unit, which allows a portable wireless device to use storage memory of the wireless device control unit.

It is yet a further object of the present invention to provide a wireless device control unit, which may also supplement storage memory through a wireless connection of other multiple portable wireless devices.

It is yet a further object of the present invention to provide a wireless device control unit, which supplements graphics capabilities of portable wireless devices with the result that Computer Aided Design, Computer Aided Engineering, and the like are operable by the portable wireless device.

It is yet a further object of the present invention to provide a wireless device control unit, which supplements software capability of a portable wireless device to allow the full operation of applications, operating systems, office suites, CAD, CAE, in addition to combinations thereof.

It is yet a further object of the present invention to provide a wireless device control unit, which supplements input and output interconnectivity to a portable wireless device through wireless and physical I/O ports.

Finally, it is another object of the present invention to provide a wireless device control unit, which includes hierarchical architecture that complements portable wireless devices with IEEE 802 standards.

These and additional objects, advantages, features and benefits of the present invention will become apparent from the following specification.

DETAILED DESCRIPTION OF THE PREFERRED EMBODIMENTS

Figure 1:
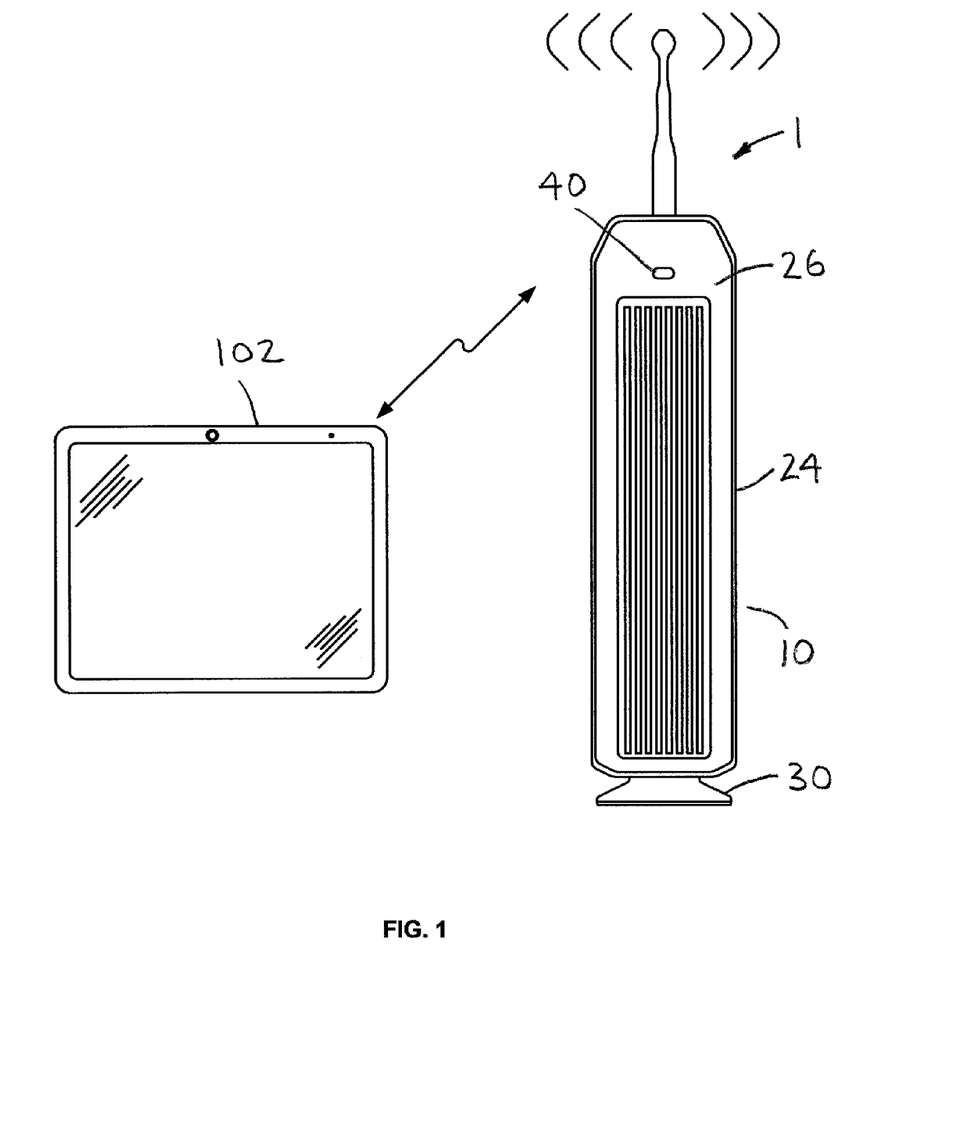
FIG. 1 is a front view of a portable wireless device and a wireless device control unit wirelessly communicating with each other in accordance with the present invention.
Figure 6:
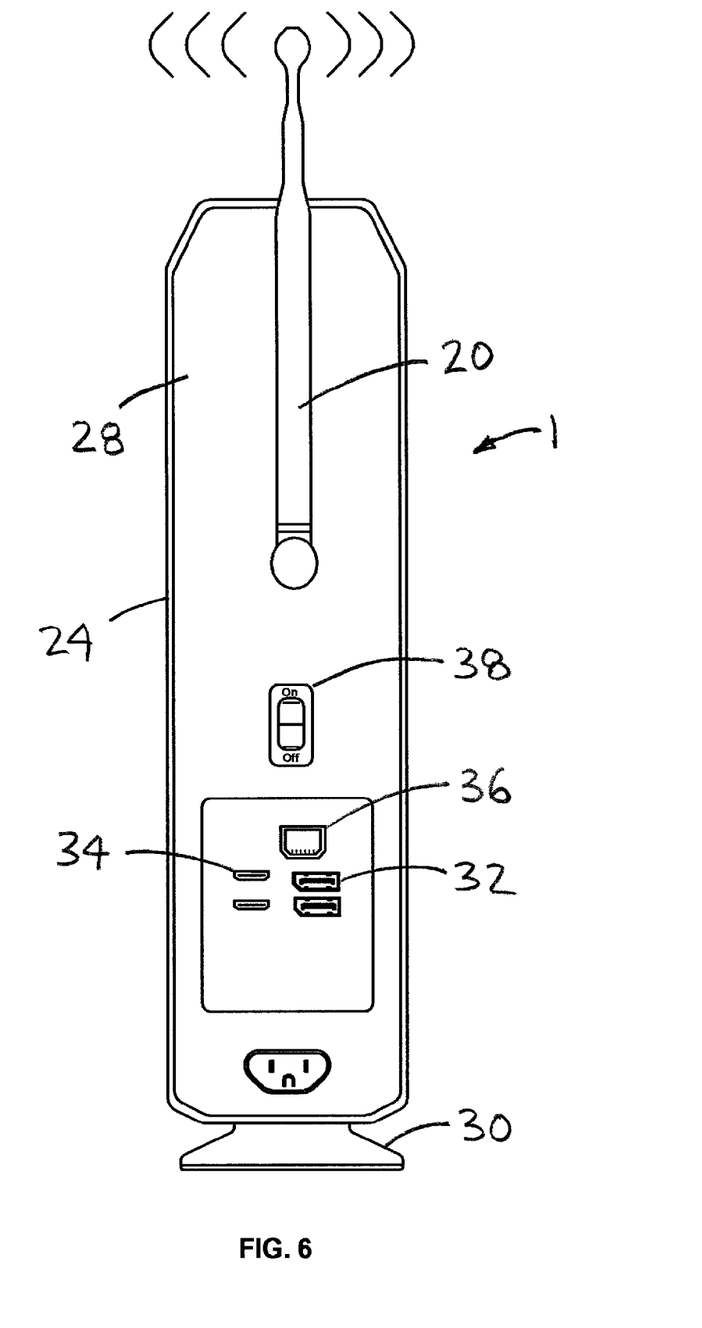
FIG. 6 is a rear view of a wireless device control unit in accordance with the present invention.
Figure 7:
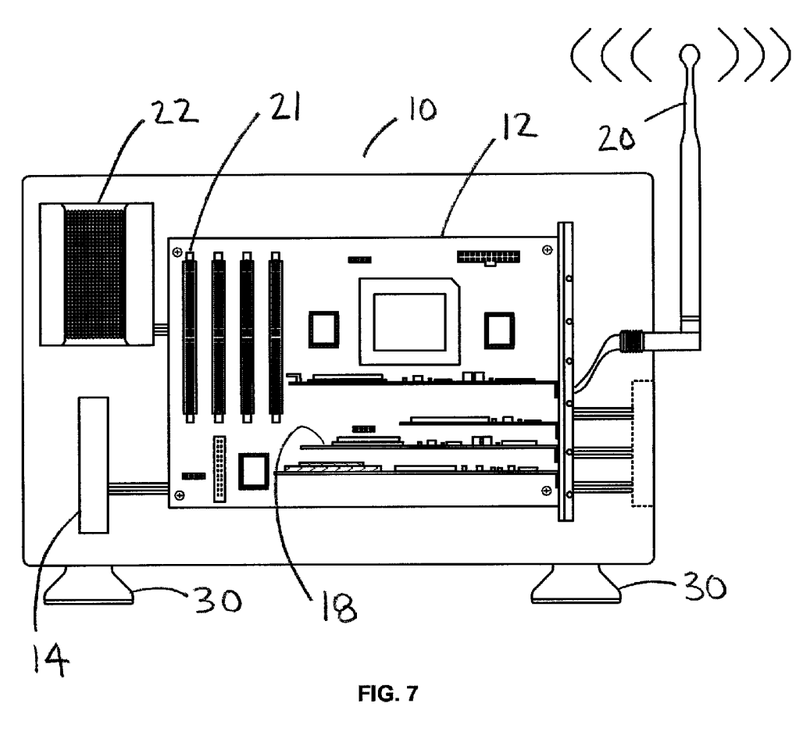
FIG. 7 is a cross sectional view of a wireless device control unit in accordance with the present invention.
Figure 8:
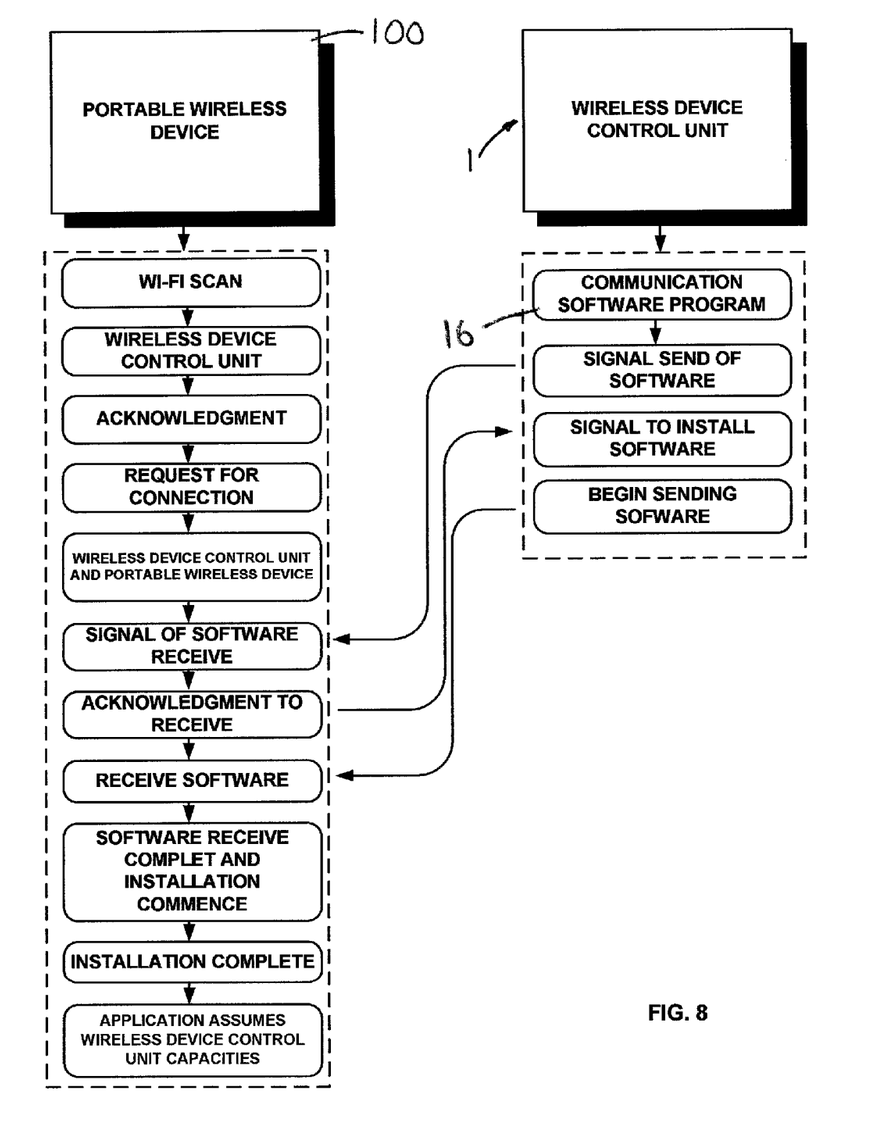
FIG. 8 is a flow chart of a wireless device control device downloading a communication software program to a portable wireless device in accordance with the present invention.

With reference now to the drawings, and particularly to FIG. 7, there is shown a cross sectional view of a wireless device control unit 1. With reference to FIGS. 1, 6 and 8, the wireless device control unit 1 preferably includes a housing 10, an electronic control board 12, a hard drive 14, a communication software program 16, a wireless modem 18, an antenna 20, random access memory 21 and a plurality of ports. The housing 10 may be any suitable shape or design. The housing preferably includes a case 24, a front panel 26, a rear panel 28 and at least one foot 30. The electronic control board 12 is retained in the case 24. The electronic control board 12 is preferably microprocessor based. The hard drive 14 provides storage for the electronic control board 12.

Figure 9:
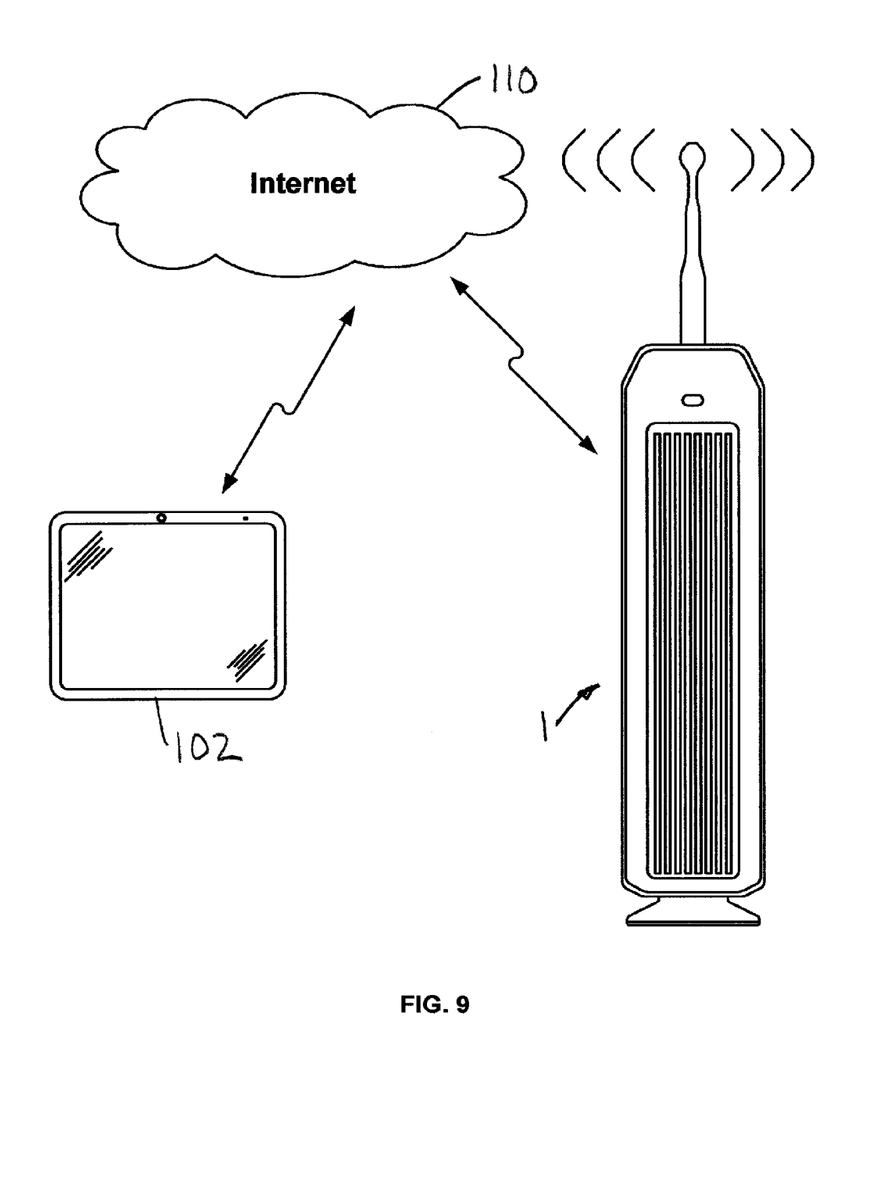
FIG. 9 is a schematic diagram of a wireless device control unit communicating with a wireless device through the Internet in accordance with the present invention.

With reference to FIGS. 8-9, the communication software program 16 is preferably stored on the hard drive 14. The communication software program 16 is downloaded to a portable wireless device (client) 100. The communication software program 16 allows the portable wireless device 100 to access the computing power, memory and storage capacity of the wireless device control unit 1. The wireless modem 18 provides a connection to the Internet 110. The antenna 20 is connected to the wireless modem 18. The antenna 20 receives and transmits wireless signals.

With reference to FIG. 6, at least one display port 32, at least one USB port 34 and an ethernet port 36 are preferably connected to the electronic control board 12. The plurality of ports allow the wireless device control unit 1 to transfer electrical signals through an electrical line to the at least one portable wireless device 100. An electrical power supply 22 provides electrical power to all the electrical components of the wireless device control unit 1. The electrical power supply 22 receives electrical power from at least a 115 AC voltage source. An on-off switch 38 is used to supply AC voltage to the power supply 22. A power light 40 preferably shows that the wireless device control unit 1 is powered.

Figure 2:
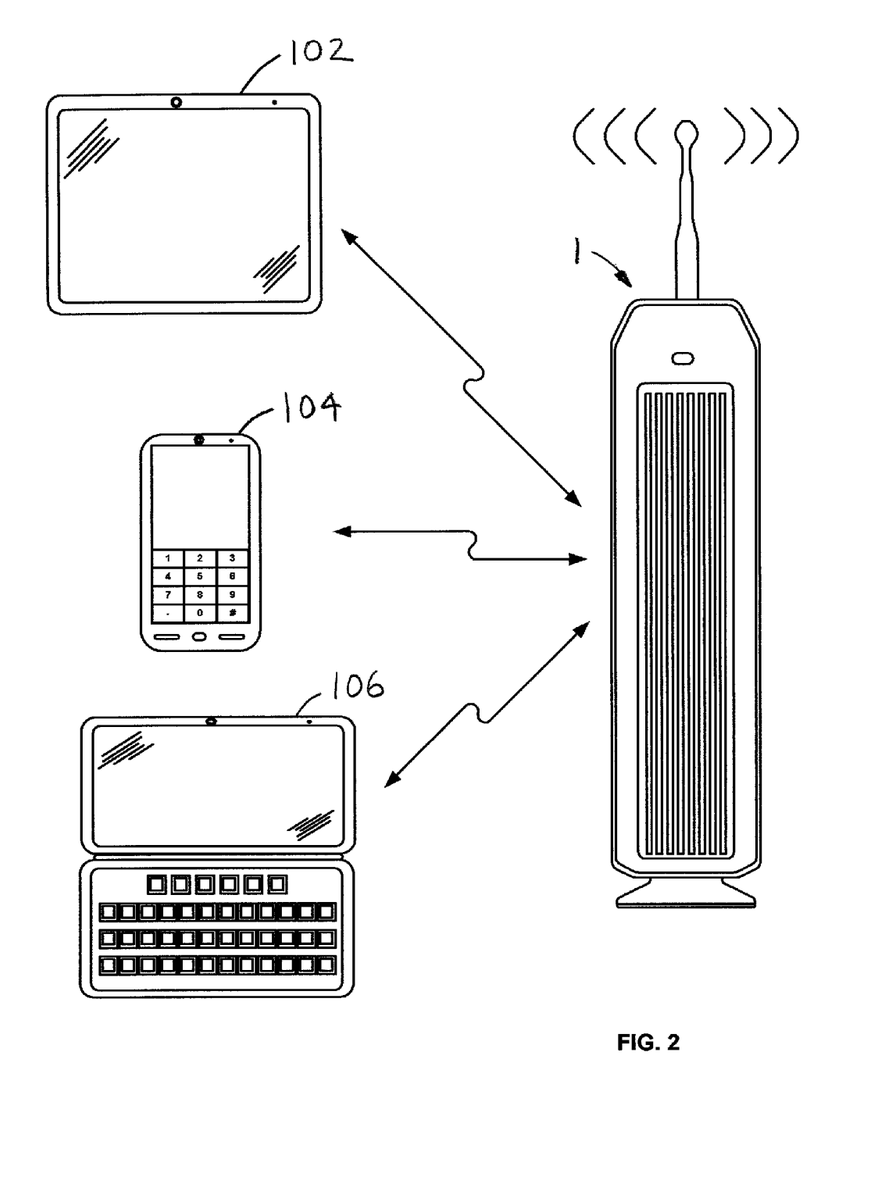
FIG. 2 is a front view of a plurality of portable wireless devices communicating with a wireless device control unit in accordance with the present invention.
Figure 3:
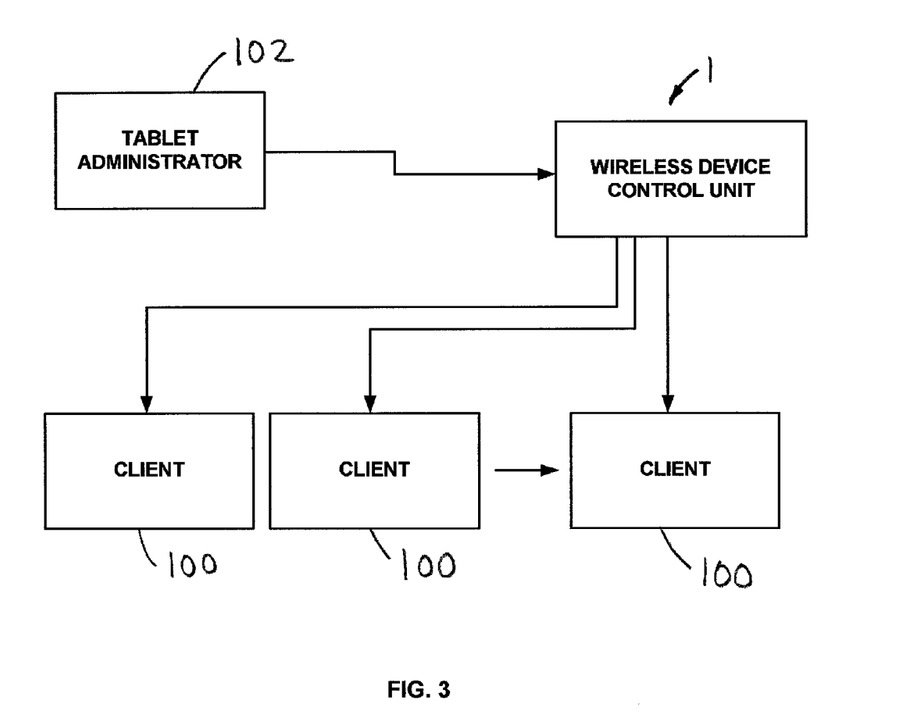
FIG. 3 is a block diagram of a software operations hierarchy of a wireless device control unit and a plurality of portable wireless devices in accordance with the present invention.

With reference to FIG. 2, the wireless device control unit 1 may enhance the capabilities of not only the tablet 102, but also a cell phone 104 and a laptop computer 106. With reference to FIG. 3, the tablet 102 may be used to instruct the wireless device control unit 1 to serve a plurality of wireless devices 100.

Figure 4A:
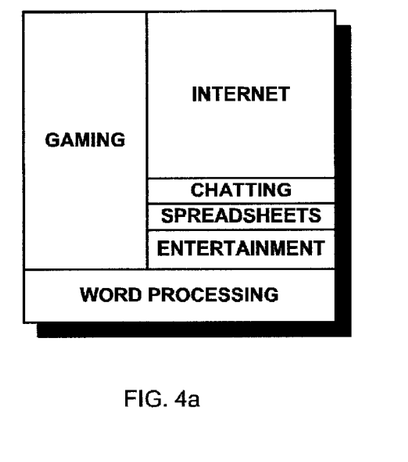
FIG. 4a is a table providing processing capabilities of a tablet in accordance with the present invention.
Figure 4B:
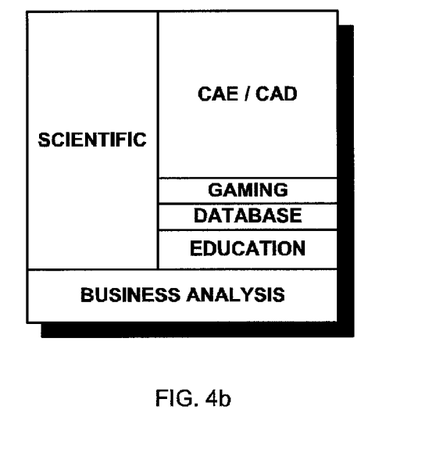
FIG. 4b is a table providing processing capabilities of a wireless device control unit in accordance with the present invention.

A comparison is provided between the capabilities of a typical tablet and a tablet utilizing the wireless device control unit in FIGS. 4a and 4b. With reference to FIG. 4a, most tablets are used for small games, which are mostly applications and not fully operational programs. At this level most users use the tablet to surf the Internet, and that is more of a surfing and browsing, rather than using it for in-depth operations that would tax a tablet's Internet operations, such as editing websites, programming, e-commerce, and the like. Basic chatting is used at the tablet level and basic text, such as yahoo messenger, Microsoft Skype, Twitter and vk. Further, basic spreadsheets for adding, subtracting, and handling large amounts of data in megabyte size. At the entertainment level, use of online viewing of streaming video and audio, and use of audio online services. The user views audio/video content from online request or view limited saved content. At the word processing level, a user applies available processes allowed by the word processing program. Most documents in multiple formats are created and saved for later use.

With reference to FIG. 4b, a user can access scientific data and use the wireless device control unit 1 to attach peripherals for handling scientific level operations, which would be impossible on the tablet 102 by itself. The tablet 102 serves as a virtual window into ongoing scientific processing conducted by the wireless device control unit 1. The tablet 102 acts as a screen viewing the actual work conducted by the wireless device control unit 1, and the virtual operations by the wireless device control unit 1, if attached to other online or network systems.

The tablet 102 user with a connection to the wireless device control unit 1 may not only conduct CAE/CAD work done by the wireless device control unit 1 and additionally operations and processes, done by the wireless device control unit 1. The tablet 102 utilizing the wireless device control unit 1 would be able to use programs such as Autodesk's AutoCAD, Dassault Systems CATIA, Pro/Engineer (Now Creo Parametric). The programs are installed on the wireless device control unit 1 and the operations conducted by the wireless device control unit 1 through the tablet 102. A user would also be able to conduct 3*d* and flow work.

By default, the user can play games, which require intensive computing power. As with other uses, gaming at any level would be conducted through the wireless device control unit 1. The tablet 102 conducting heavy use gaming would normally tax the battery life thereof due to very intensive use of processor and memory. However, the tablet 102 utilizing the power supply and memory of the wireless device control unit 1 would permit most, if not all activity of the wireless device control unit 1 with its virtually endless energy supply. The end result being saving battery power of the tablet 102. Therefore, as with other higher capacities conducted through the wireless device control unit 1, the user of the tablet 102 could manipulate massive files for a database as well, including pre-kinder to college and university education work.

As with the above mentioned abilities, business analysis can also be conducted on the tablet 102 through the wireless device control unit 1, such as data warehousing, stock analysis, business techniques, operating process flow in a plant. The tablet 102 and wireless device control unit 1 combination would also work in a IT environment for conducting all the activity or most of the activity by the wireless device control unit 1, which can be connected to networks, the Internet and systems.

Figure 5:
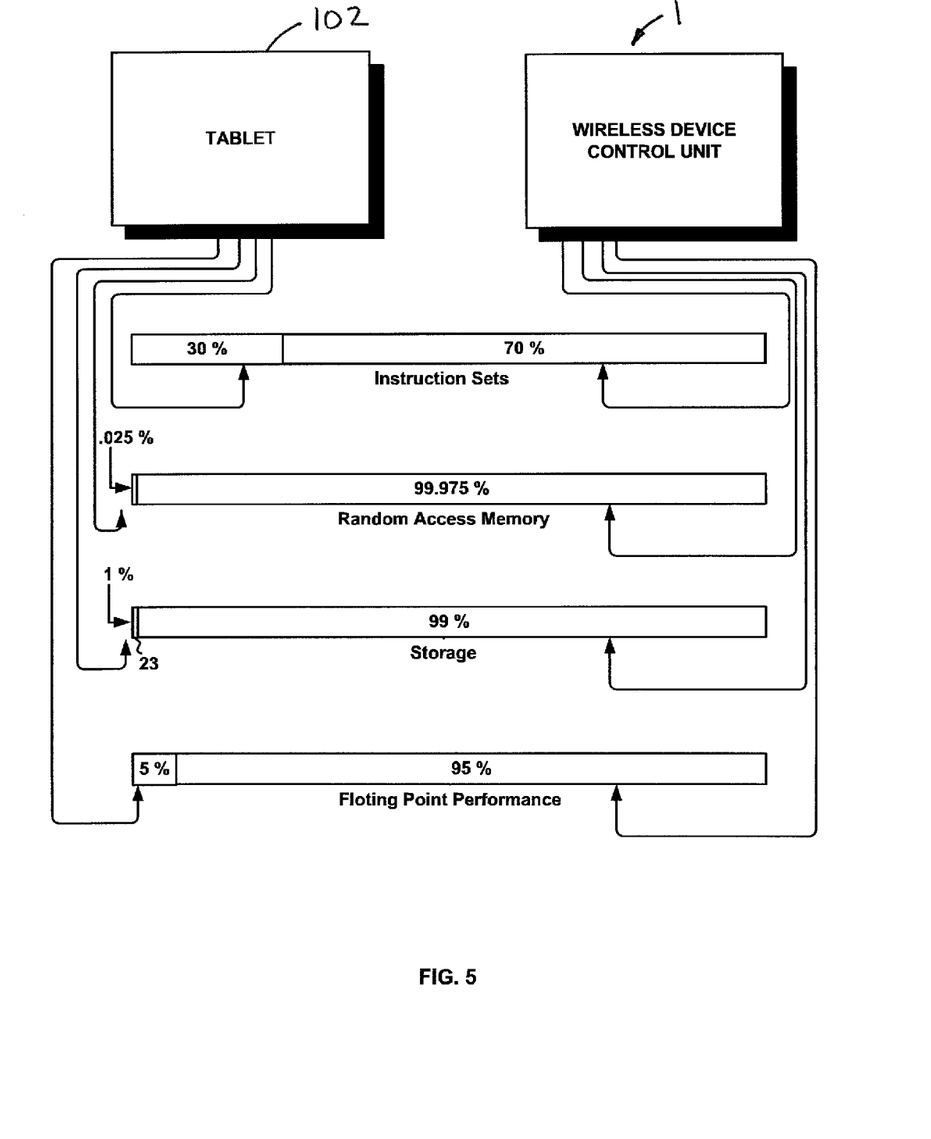
FIG. 5 is a block diagram of performance and capacities of a portable wireless device utilizing a wireless device control unit in accordance with the present invention.

FIG. 5 is a block diagram of performance and capacities of the portable wireless device 100 utilizing the wireless device control unit 1. The tablet 102 handles 30% of instruction sets, while the wireless device control unit 1 handles 70% of the instruction sets. The tablet 102 provides 0.025% of random access memory, while the wireless device control unit 1 provides 99.975% of the random access memory. The tablet 102 provides 1% of storage, while the wireless device control unit 1 provides 99% of the storage. The tablet 102 provides 5% of floating point performance, while the wireless device control unit 1 provides 95% of floating point performance.

With reference to FIG. 8, the communication software program 16 is resident in the wireless device control unit 1. The communication software program 16 is sequestered through an initial wi-fi scan initiated by the portable wireless device 100. As with wi-fi initiation, a scan is initiated whereby the wireless device control unit 1 acknowledges the portable wireless device 100. The portable wireless device 100 receives an acknowledgement from the wireless device control unit 1. The request for connection is initiated by the portable wireless device 100 and the wireless device control unit 1. The wireless device control unit 1 awaits from the user, a signal to connect and download the communication software program to the portable wireless device 100.

The following sequences occur between the portable wireless device 100 and the wireless device control unit 1, SIGNAL SEND OF SOFTWARE from the wireless device control unit 1 is sent to the portable wireless device 100; SIGNAL OF SOFTWARE RECEIVE from the portable wireless device 100 is sent to the wireless device control unit 1; ACKNOWLEDGEMENT TO RECEIVE awaits from the wireless device control unit 1 a SIGNAL TO INSTALL SOFTWARE; the wireless device control unit 1 BEGINS SENDING SOFTWARE wirelessly; and as the SOFTWARE RECEIVE, SOFTWARE RECEIVE COMPLETE AND INSTALLATION COMMENCE, or setup is initialized by the portable wireless device 100.

The INSTALLATION IS COMPLETE when the communication software program 16 is installed on the portable wireless device 100 and the APPLICATION ASSUMES WIRELESS DEVICE CONTROL UNIT CAPACITIES. The capacities include instruction sets, random access memory, storage and floating point performance. In essence, all conductivity is conducted by the wireless device tablet control unit 1. The portable wireless device 100 works very little and is a virtual window of the computational operations of the wireless device control unit 1. Therefore, with wi-fi, and/or WiGig (IEEE 802.11 ad) connectivity between the portable wireless device 100 and the wireless device control unit 1 permits a high level of activity between the wireless device control unit 1 and at least one portable wireless device 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A supplemental capacity unit for at least one portable wireless device, comprising:
   an electronic control board having wireless communication and at least one connection port, said at least one connection port is capable of interfacing with an additional device to increase computational power to facilitate at least one of computer aided design, gaming and scientific calculation; and
   a communication software program being accessible by said electronic control board, said communication software program being installed on at least one portable wireless device through wireless communication with said electronic control board, said communication software program enables the at least one portable wireless device to use computing power of said electronic control board, said at least one portable wireless device capable of accessing the increased computational power of said additional device, said electronic control board provides an increase in floating point performance of as much as 1,900 percent relative to the at least one portable wireless device.

2. The supplemental capacity unit for at least one portable wireless device of claim 1 wherein:
   the at least one portable wireless device being one of a tablet, a cellular phone and a laptop computer.

3. The supplemental capacity unit for at least one portable wireless device of claim 1 wherein:
   said supplemental capacity unit providing an increase in memory capacity of as much as 9,900 percent as that of the at least one portable wireless device.

4. The supplemental capacity unit for at least one portable wireless device of claim 1 wherein:
   said supplemental capacity unit includes input and output ports for transferring electrical signals through an electrical line to the at least one portable wireless device.

5. The supplemental capacity unit for at least one portable wireless device of claim 1 wherein:
   said supplemental capacity unit providing an increase in memory capacity of as much as 9,900 percent as that of the at least one portable wireless device.

6. The supplemental capacity unit for at least one portable wireless device of claim 1 wherein:
   said supplemental capacity unit includes input and output ports for transferring electrical signals through an electrical line to the at least one portable wireless device.

7. A supplemental capacity unit for at least one portable wireless device, comprising:

an electronic control board having wireless communication and at least one connection port, said at least one connection port is capable of interfacing with an additional device to increase computational power to facilitate at least one of computer aided design, gaming and scientific calculation; and a communication software program being accessible by said electronic control board, said communication software program being installed on at least one portable wireless device through wireless communication with said electronic control board, said communication software program enables the at least one portable wireless device to use computing power of said electronic control board, said at least one portable wireless device capable of accessing the increased computational power of said additional device, said electronic control board provides an increase in random access memory for as much as 399,900 percent relative to the at least one portable wireless device.

8. The supplemental capacity unit for at least one portable wireless device of claim 7 wherein:

the at least one portable wireless device being one of a tablet, a cellular phone and a laptop computer.

9. A supplemental capacity unit for at least one portable wireless device, comprising:

an electronic control board having wireless communication and at least one connection port, said at least one connection port is capable of interfacing with an additional device to increase computational power to facilitate at least one of computer aided design, gaming and scientific calculation; and a communication software program being accessible by said electronic control board, said communication software program being installed on at least one portable wireless device through wireless communication with said electronic control board, said communication software program enables the at least one portable wireless device to use computing power of said electronic control board, said at least one portable wireless device capable of accessing the increased computational power of said additional device, said electronic control board provides an increase in instructional sets for as much as 233 percent relative to the at least one portable wireless device.

10. The supplemental capacity unit for at least one portable wireless device of claim 9 wherein:

the at least one portable wireless device being one of a tablet, a cellular phone and a laptop computer.

11. The supplemental capacity unit for at least one portable wireless device of claim 9 wherein:

said supplemental capacity unit providing an increase in memory capacity of as much as 9,900 percent as that of the at least one portable wireless device.

12. The supplemental capacity unit for at least one portable wireless device of claim 9 wherein:

said supplemental capacity unit includes input and output ports for transferring electrical signals through an electrical line to the at least one portable wireless device.

* * * * *